US011334240B2

(12) United States Patent
Liu et al.

(10) Patent No.: US 11,334,240 B2
(45) Date of Patent: May 17, 2022

(54) METHOD, DEVICE, ELECTRONIC DEVICE, AND STORAGE MEDIUM FOR SENDING AND RECEIVING MESSAGE

(71) Applicant: Beijing Dajia Internet Information Technology Co., Ltd., Beijing (CN)

(72) Inventors: Xuan Liu, Beijing (CN); Zhenlong Bai, Beijing (CN); Kaijian Jiang, Beijing (CN); Chao Wang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/935,783

(22) Filed: Jul. 22, 2020

(65) Prior Publication Data

US 2020/0348838 A1    Nov. 5, 2020

(30) Foreign Application Priority Data

Jul. 22, 2019    (CN) .......................... 201910662694.8

(51) Int. Cl.
*G06F 3/0488* (2022.01)
*G06F 3/0481* (2022.01)
*H04L 12/58* (2006.01)
*G06F 3/04883* (2022.01)
*G06F 3/04817* (2022.01)
*H04L 51/046* (2022.01)
*H04L 51/10* (2022.01)

(52) U.S. Cl.
CPC ...... *G06F 3/04883* (2013.01); *G06F 3/04817* (2013.01); *H04L 51/046* (2013.01); *H04L 51/10* (2013.01)

(58) Field of Classification Search
CPC ............ G06F 3/04883; G06F 3/04817; H04L 51/046; H04L 51/10
See application file for complete search history.

(56) References Cited

U.S. PATENT DOCUMENTS

| 8,256,000 | B1* | 8/2012 | Krishnappa | ............ G06F 21/564 726/24 |
| 8,312,388 | B2* | 11/2012 | Yoshihama | ............ G06F 16/957 715/838 |
| 8,630,494 | B1* | 1/2014 | Svendsen | ................ H04L 51/10 382/209 |

(Continued)

FOREIGN PATENT DOCUMENTS

| CN | 104780093 A | 7/2015 |
| CN | 106933592 A | 7/2017 |
| CN | 109165072 A | 1/2019 |

*Primary Examiner* — Daeho D Song
(74) *Attorney, Agent, or Firm* — Knobbe, Martens, Olson & Bear, LLP (57) ABSTRACT

The present disclosure provides a method, device, electronic device, and storage medium for sending and receiving message. The method for sending a message can include: receiving an operation instruction for selecting a resource icon; acquiring an image resource based on the resource icon in response to the operation instruction; detecting an operation gesture; determining control information of the image resource for controlling a presentation effect of the image resource based on the operation gesture; generating the message by encapsulating the image resource and the control information; and sending the message to a receiver device.

12 Claims, 10 Drawing Sheets a b (56) References Cited

U.S. PATENT DOCUMENTS

| | | | |
|---|---|---|---|
| 9,898,111 B2* | 2/2018 | Myung | G06F 3/041 |
| 10,095,380 B2* | 10/2018 | Moon | G06F 3/04817 |
| 10,761,717 B2* | 9/2020 | Bell | G06F 9/451 |
| 2010/0090971 A1* | 4/2010 | Choi | G06F 3/0482 |
| | | | 345/173 |
| 2014/0351350 A1* | 11/2014 | Lee | G06F 3/0481 |
| | | | 709/206 |
| 2015/0234467 A1* | 8/2015 | Tachibana | G06F 3/017 |
| | | | 715/863 |
| 2015/0327033 A1* | 11/2015 | Kalman | G09G 5/363 |
| | | | 455/466 |
| 2015/0378590 A1* | 12/2015 | Kim | H04L 51/046 |
| | | | 715/752 |
| 2016/0006679 A1* | 1/2016 | Williams | H04L 12/1859 |
| | | | 455/466 |
| 2016/0062630 A1* | 3/2016 | Anzu | G06T 11/20 |
| | | | 715/739 |
| 2017/0006080 A1* | 1/2017 | Fang | H04N 21/2387 |
| 2017/0010794 A1* | 1/2017 | Cho | G06F 3/04817 |
| 2017/0357324 A1* | 12/2017 | Chaudhri | H04N 5/23216 |
| 2018/0012308 A1* | 1/2018 | Zha | G06Q 30/0236 |
| 2018/0285149 A1* | 10/2018 | Bhandari | G06F 3/04817 |
| 2018/0331993 A1* | 11/2018 | Tian | H04L 51/046 |
| 2019/0221044 A1* | 7/2019 | Motta | H04N 13/344 |
| 2020/0228479 A1* | 7/2020 | Nigro | H04L 51/10 |

* cited by examiner

METHOD, DEVICE, ELECTRONIC DEVICE, AND STORAGE MEDIUM FOR SENDING AND RECEIVING MESSAGE

CROSS-REFERENCE TO RELATED APPLICATION

This application is based on and claims priority under 35 U.S.C 119 to Chinese Patent Application No. 201910662694.8, filed on Jul. 22, 2019, in the China National Intellectual Property Administration. The entire disclosure of the above application is incorporated herein by reference.

FIELD

The present disclosure relates to the technical field of computer technology, and in particular to a method, device, electronic device, and storage medium for sending and receiving message.

BACKGROUND

While using an instant messaging tool for information interaction, users may communicate by sending messages in the form of characters and/or emoticons.

SUMMARY

According to an embodiment of the disclosure, method, device, electronic device, and storage medium for sending and receiving message are provided, where the method for sending a message includes the following steps.

receiving an operation instruction for selecting a resource icon;

acquiring an image resource based on the resource icon in response to an operation instruction;

determining an operation gesture;

determining control information of the image resource for controlling a presentation effect of the image resource;

generating the message by encapsulating the image resource and the control information; and sending the message to a receiver device.

In some embodiments, the determining the control information includes:

determining a moving track based on the operation gesture, where the operation gesture includes a first gesture for moving the image resource; and determining the control information based on the moving track for presenting the image resource based on a motion track, where the motion track is matched with the moving track.

In some embodiments, the control information includes the moving track, key points of the moving track and presenting durations of respective key points;

where the key points are determined based on a selecting instruction; and where the presenting durations are the durations that the image resource is presented at the respective key points.

In some embodiments, the determining the control information includes:

determining a screen touching duration based on the operation gesture, where the operation gesture includes a second gesture for playing the image resource; and determining the control information based on the screen touching duration for presenting the image resource with a presenting duration, where the presenting duration equals to the screen touching duration.

In some embodiments, the determining the control information includes:

determining a pattern based on the operation gesture, where the operation gesture includes a third gesture for drawing a pattern; and determining the control information based on the pattern for presenting the image resource with the pattern.

In some embodiments, the acquiring the image resource includes:

acquiring a unique identifier corresponding to the resource icon; and acquiring the image resource based on a pre-stored corresponding relationship between the unique identifier and the image resource.

According to an embodiment of the present disclosure, a method for receiving a message is provided, including:

receiving the message, where the message includes an image resource and control information, and the control information is used for controlling a presentation effect of the image resource; and presenting the image resource based on the control information.

In some embodiments, the presenting the image source based on the control information includes:

determining a motion track of the image resource based on the control information, where the control information includes a moving track; and presenting the image source based on the motion track.

In some embodiments, the control information further includes first key points of the moving track and presenting durations of respective first key points:

where second key points of the motion track are matched with the first key points for determining the motion track; and where the presenting durations are used for presenting the image resource to stay at respective second key points for durations corresponding to the presenting durations respectively.

In some embodiments, the control information includes a screen touching duration for presenting the image resource for same duration as the screen touching duration.

In some embodiments, the control information includes a pattern drawn by a drawing gesture for presenting the image resource with the pattern.

According to an embodiment of the present disclosure, a device for sending a message is provided, including:

a receiving unit, configured to receive an operation instruction for selecting a resource icon;

a responding unit, configured to acquire an image resource based on the resource icon in response to the operation instruction;

a detecting unit, configured to detect an operation gesture;

a determining unit, configured to determine control information of the image resource for controlling a presentation effect of the image resource based on the operation gesture; and a sending unit, configured to generate the message by encapsulating the image resource and the control information, and send the message to a receiver device.

In some embodiments, the determining unit is further configured to:

determine a moving track based on the operation gesture, where the operation gesture includes a first gesture for moving the image resource; and determine the control information based on the moving track for presenting the image resource based on a motion track, where the motion track is matched with the moving track.

In some embodiments, the control information includes the moving track, key points of the moving track and presenting durations of respective key points;

where the key points are determined by the responding unit based on a selecting instruction; and where the presenting durations received by the receiving unit, are the durations that the image resource is presented at the respective key points.

In some embodiments, the determining unit is further configured to:

determine a screen touching duration based on the operation gesture, where the operation gesture includes a second gesture for playing the image resource; and determine the control information based on the screen touching duration for presenting the image resource with a presenting duration, where the presenting duration equals to the screen touching duration.

In some embodiments, the determining unit is further configured to:

determine a pattern based on the operation gesture, where the operation gesture includes a third gesture for drawing a pattern; and determine the control information based on the pattern for presenting the image resource with the pattern.

In some embodiments, the responding unit is further configured to:

acquire a unique identifier corresponding to the resource icon; and obtain the image resource based on a pre-stored corresponding relationship between the unique identifier and the image resource.

According to an embodiment of the present disclosure, a device for receiving a message is provided, including:

a receiving unit, configured to receive the message, where the message includes an image resource and control information, and the control information is used for controlling a presentation effect of the image resource; and a presenting unit, configured to present the image source based on the control information.

In some embodiments, the presenting unit is further configured to:

determine a motion track of the image resource based on the control information, where the control information includes a moving track; and present the image source based on the motion track.

In some embodiments, the control information further includes first key points of the moving track and presenting durations of respective first key points, where second key points of the motion track are matched with the first key points for determining the motion track; and where the presenting durations are used for presenting the image resource to stay at respective second key points for durations corresponding to the presenting durations respectively.

In some embodiments, the control information includes a screen touching duration for presenting the image resource for same duration as the screen touching duration.

In some embodiments, the control information includes a pattern drawn by a drawing gesture for presenting the image resource with the pattern.

According to an embodiment of the present disclosure, an electronic device is provided, including at least one processor and a memory in connection with the at least one processor. The memory stores an instruction which may be executed by the at least one processor, and the instruction is executed by the at least one processor so that the at least one processor may execute any one method for sending a message provided by the embodiment of the present disclosure.

According to an embodiment of the present disclosure, a computer storage medium is provided. The computer storage medium stores a computer executable instruction, and the computer executable instruction is for a computer to execute any one method for sending a message provided by the embodiment of the present disclosure.

According to an embodiment of the present disclosure, a computer program product is provided, including a program code. The program code is for a computer device to execute any one method for sending a message provided by the embodiment of the present disclosure, during the computer program product operating on the computer device.

According to an embodiment of the present disclosure, an electronic device is provided, including at least one processor and a memory in connection with the at least one processor. The memory stores an instruction which may be executed by the at least one processor, and the instruction is executed by the at least one processor so that the at least one processor may execute any one method for receiving a message provided by the embodiment of the present disclosure.

According to an embodiment of the present disclosure, a computer storage medium is provided. The computer storage medium stores a computer executable instruction, and the computer executable instruction is for a computer to execute any one method for receiving a message provided by the embodiment of the present disclosure.

According to an embodiment of the present disclosure, a computer program product is provided, including a program code. The program code is for a computer device to execute any one method for receiving a message provided by the embodiment of the present disclosure, during the computer program product operating on the computer device.

BRIEF DESCRIPTION OF THE DRAWINGS

In order to describe the technical solutions of the embodiments of the present disclosure more clearly, the accompanying drawings required in the embodiments of the present disclosure will be briefly introduced. Apparently, the accompanying drawings introduced as below show only some embodiments of the present disclosure, and a person of ordinary skill in the art may still derive other accompanying drawings from these accompanying drawings without creative efforts.

DETAILED DESCRIPTION OF THE EMBODIMENTS

In order to make objectives, technical solutions and advantages of the embodiments of the present disclosure clearer, the technical solutions in the embodiments of the present disclosure will be described clearly and completely below in conjunction with the accompanying drawings according to the embodiments of the present disclosure.

In some embodiments, a method for sending a message is provided by the present disclosure. In the method, an icon and an image of an emoticon may be separately stored. A user may select a resource icon (e.g., an icon of an emoticon) in a display area, and a sender device acquires an image resource (e.g., an image of an emoticon) corresponding to the selected resource icon in response to an operation instruction for selecting the resource icon. The user may control a presentation effect of the image resource by virtue of an operation gesture in a specified display area. The sender device detects the operation gesture of the user and determines control information of the image resource based on the operation gesture. The sender device encapsulates the image resource and the control information into a message, and sends the message to a receiver device.

According to the above-mentioned method, an image of an emoticon is not just static or dynamic, but also an image with sound and vibration. A user may also control the display effect of the image resource by virtue of the operation gesture.

Figure 1:
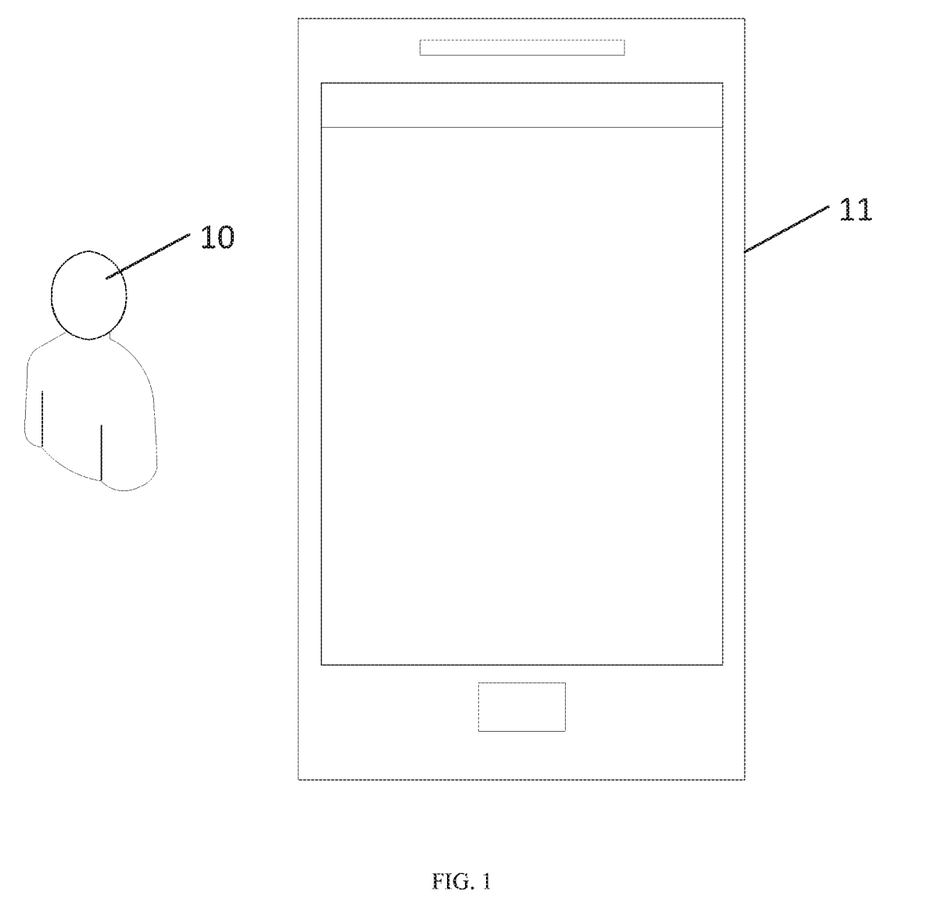
FIG. 1 illustrates a schematic diagram of an application scene of a method for sending a message according to an embodiment of the present disclosure.

In some embodiments, FIG. 1 illustrates a schematic diagram of an application scene of a method for sending a message provided by the present disclosure. The scene includes a sender 10, and a mobile terminal 11 of the sender. The method in the scene includes following steps.

The sender 10 selects a resource icon from an interface of the mobile terminal 11, and the mobile terminal 11 acquires an image resource corresponding to the selected resource icon in response to an operation instruction for selecting the resource icon. The mobile terminal 11 detects an operation gesture in a specified display area. Control information of the image resource is determined by the mobile terminal 11 according to the detected operation gesture, where the control information is for controlling a presentation effect of the image resource. The mobile terminal 11 encapsulates the image resource and the control information into a message, and then sends the message to a receiver device.

In some embodiments, the mobile terminal 11 includes an intelligent terminal, or a tablet personal computer, etc.

Figure 2:
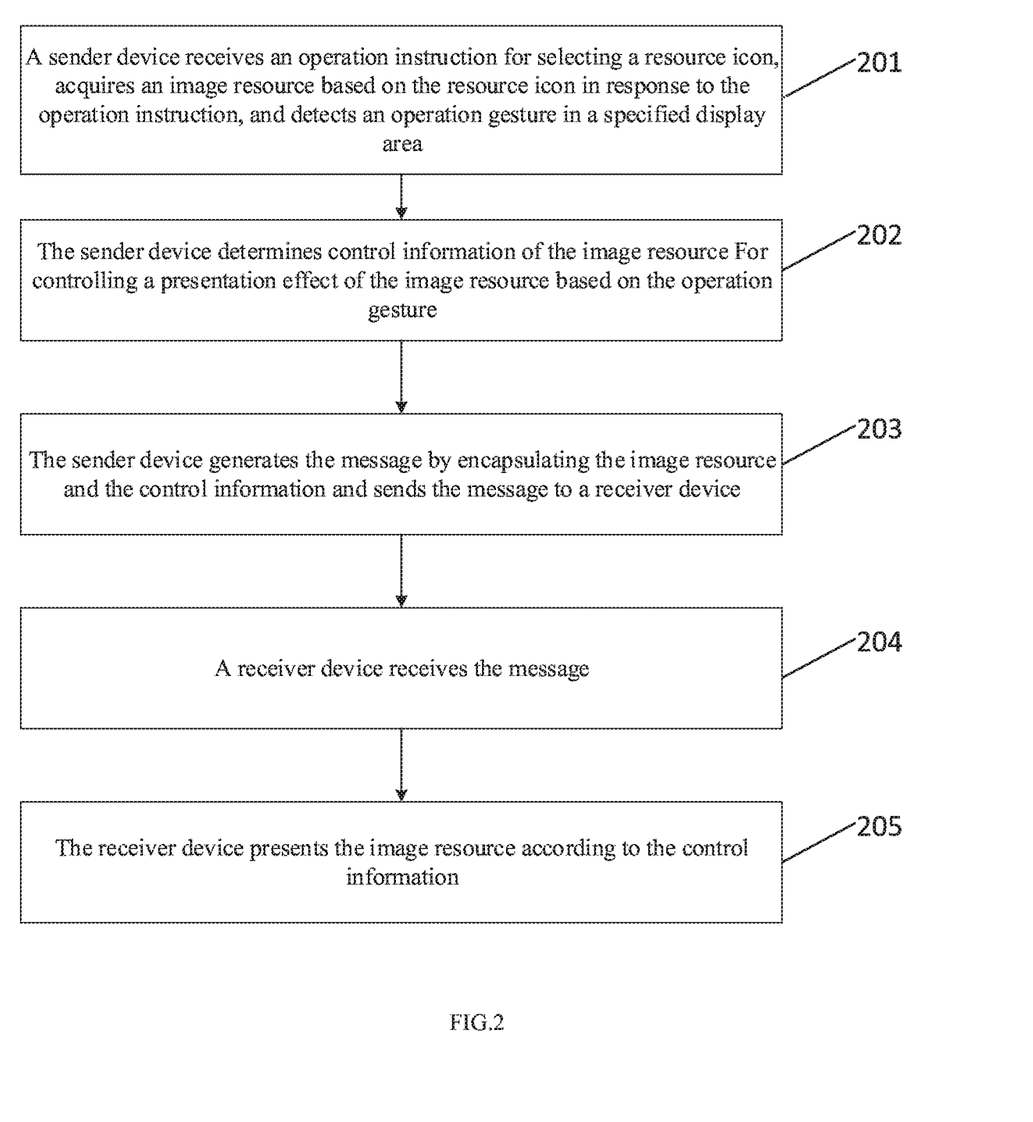
FIG. 2 illustrates a flow diagram of a method for sending a message according to an embodiment of the present disclosure.

In some embodiments, FIG. 2 illustrates a flow diagram of a method for sending a message provided by the present disclosure, the method includes the following steps.

Step 201: a sender device (e.g., a mobile terminal) receives an operation instruction for selecting a resource icon, acquires an image resource based on the resource icon in response to the operation instruction, and detects an operation gesture in a specified display area.

In some embodiments, the image resource includes a static image, a dynamic image or an image and the like with sound, vibration and other effects.

In some embodiments, the sender device acquires a unique identifier of the selected resource icon, and an image resource corresponding to the unique identifier based on a pre-stored corresponding relationship between the unique identifier of the resource icon and the image resource.

In some embodiments, the static image and behavior description information of the static image are stored respectively. The behavior description information presents a motion state and information such as sound and vibration of the static image. The static image corresponds to a resource icon, and its behavior information and storage address are included in a resource allocation file. The resource allocation file is configured for each resource icon, respectively, and also includes a unique identifier of each resource icon.

Step 202: the sender device determines control information of the image resource for controlling a presentation effect of the image resource based on the operation gesture.

Step 203: the sender device generates the message by encapsulating the image resource and the control information and sends the message to a receiver device.

In some embodiments, the above step for encapsulation is triggered by a user double-clicking the image resource or clicking a sending button.

Step 204: a receiver device receives the message.

Step 205: the receiver device presents the image resource according to the control information.

In the above-mentioned method, an emoticon is not only a single static image or a dynamic image, but also an image with sound and vibration. Besides, the presentation effect of the image resource can be controlled by a user's operation gesture, so that the application of emoticons is closer to the demand of the user.

In some embodiments, before the image resource and the control information are encapsulated into the message, the sender device may also present the image resource according to the control information.

In some embodiments, after the sender device determines the control information, the presentation effect of the image resource is controlled in a presentation interface according to the control information.

According to the above-mentioned method, before the message is sent to the receiver device, the image resource may be presented according to the control information, so that the aim of reviewing the presentation effect of the image resource is achieved.

In the above-mentioned step 202, the operation gesture includes at least one of the followings: a moving gesture for moving the image resource, a playing gesture for playing the image resource and a drawing gesture for drawing a pattern.

In some embodiments, the control information is determined based on a moving track of a moving gesture, if the operation gesture is the moving gesture. The control information is determined based on a screen touching duration of a playing gesture, if the operation gesture is the playing gesture. The control information is determined based on a pattern drawn by virtue of a drawing gesture, if the operation gesture is the drawing gesture.

In order to clearly understand the technical solution provided by the embodiment of the present disclosure, the technical solution of the present disclosure is further explained below with the different operation gestures as examples.

In the first embodiment, the operation gesture includes the moving gesture for moving the image resource.

In some embodiments, the moving gesture is triggered by a user pressing a touch point on a touch screen to a specified force, and the touch point is moved. The sender device determines a moving track of the moving gesture, and determines the control information based on the moving track. For example, the user clicks the touch screen to make the pressing force at the touch point reach 0.3, and the user moves fingers to move the touch point, which triggers the moving gesture.

In addition, the specified force may be voluntarily set according to a situation, for example, the specified force may be set to be 0.3, 0.2 and the like, but is not specifically limited in the present disclosure.

Figure 3:
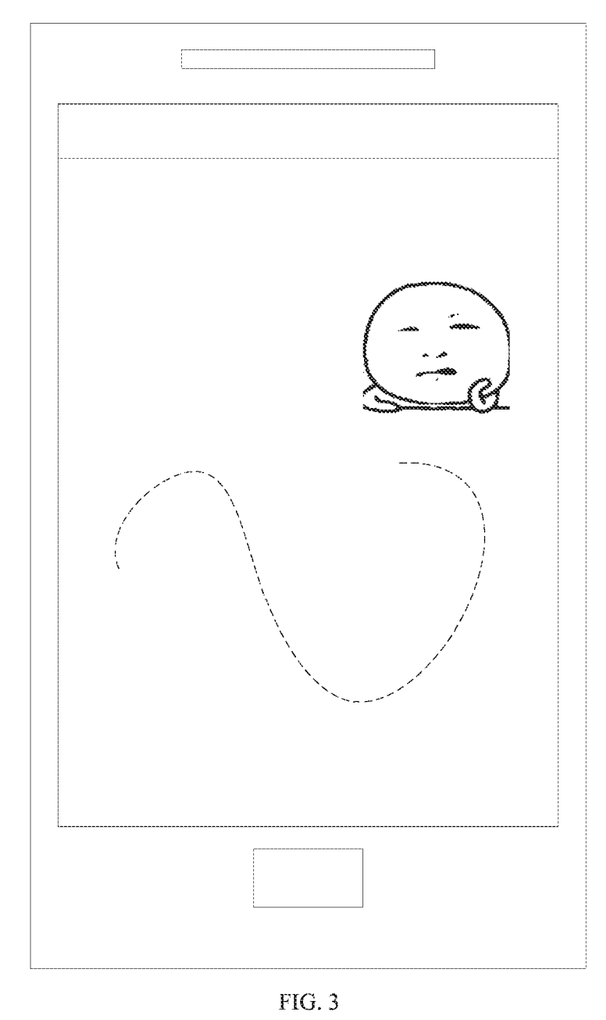
FIG. 3 illustrates a schematic diagram of an interface according to an embodiment of the present disclosure.

In some embodiments, FIG. 3 illustrates a schematic diagram of an interface provided by the present disclosure. The user triggers the moving gesture, and the moving track of the moving gesture is represented by a dotted line shown in FIG. 3. The sender device acquires the moving track and controls the image resource to move according to a motion track matched with the moving track. By the sender device, the moving track is encapsulated as a message with the image resource, in response to a user double clicks on the touch screen, and the message is sent to the receiver device.

The image resource in the message is controlled to move according to the motion track, after the receiver device receives the message.

In some embodiments, in order to be able to make the image resource more user-friendly, it is also possible to set how the image resource is presented. For example, the image resource is presented at a speed that follows the motion track, stays at key points in the motion track for a duration of time and the like. Here is further information on how to set up a moving track with two different setup methods.

In one embodiment, a sender sets relevant information of the moving track.

The sender device receives presenting durations set for key points of the moving track in response to an instruction for selecting the key points. The presenting durations are stay durations, at the key points, of the image resource being presented. The control information of the image resource includes the moving track, the key points and the presenting durations.

In some embodiments, one of the presenting durations is separately set for each of the key points, and the presenting durations of all the key points are different. It is also possible to set the same presenting duration for all the key points of one moving track.

After the receiver device receives the message, key points of the motion track are determined, where the key points of the motion track are matched with those of the moving track. Moreover, the image resource is controlled to move according to the motion track and stay at the key points of the motion track for the presenting durations.

Figure 4:
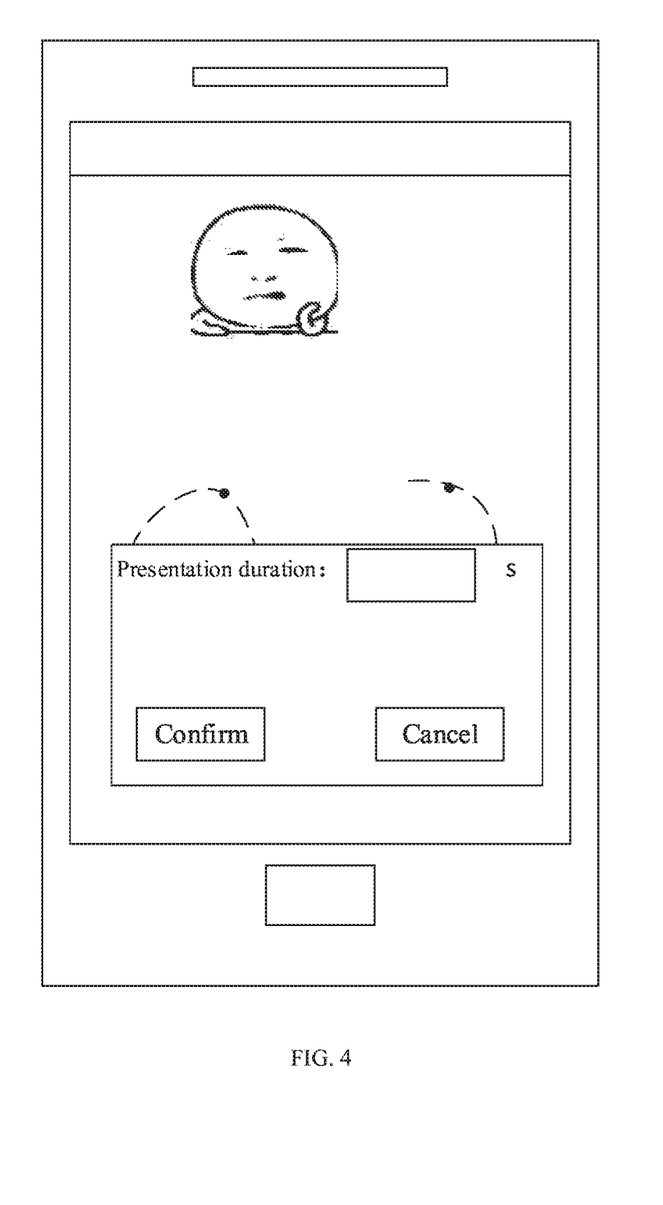
FIG. 4 illustrates a schematic diagram of another interface according to an embodiment of the present disclosure.

In some embodiments, FIG. 4 illustrates a schematic diagram of another interface provided by the present disclosure. As shown in FIG. 4, the moving track is presented after being acquired by the sender device. The user selects the key points (shown as black points in FIG. 4) of the moving track on the presented moving track. After the user selects the key points, a set interface may be displayed in a pop-up window form for the user to set the presenting durations of the selected key points.

In some embodiments, the user sets the presenting durations of the key points to default values. The default values may be set according to an actual demand, such as 0.5 s, 1 s and so on.

In some embodiments, the user sets a total presenting duration of the image resource may be set, and during presenting the image resource, the image resource may be controlled to be presented at a constant speed according to the length of the moving track. The control information of the image resource includes the total presenting duration of the image resource, the moving track and the length of the moving track.

After the receiver device receives the message, a speed for constant-speed presentation of the image resource may be determined according to the total presenting duration and the length of the moving track, and then, the image resource is controlled to move at the speed according to the motion track matched with the moving track.

In some embodiments, after the key points of the moving track are selected, presenting durations are set for respective key points, and total presenting duration of the image resource is set. The control information of the image resource includes the moving track, the key points, the presenting durations and the total presenting duration.

After the receiver device receives the message, the key points of the motion track and the speed for constant-speed presentation of the image resource are determined, and then, the image resource is controlled to move at the speed according to the motion track and stay at the key points of the motion track for the presenting duration.

In one embodiment, the relevant information of the moving track is determined according to the moving gesture.

In some embodiments, the key points of the moving track and the presenting duration of each of the key points may be determined according to the moving gesture triggered by the user in the touch screen. For example, the user triggers the moving gesture in the touch screen, then, the sender device acquires the moving track as well as a speed that the user moves the fingers and a duration that the user remains at each point in the moving track. The control information includes the moving track, the speed that the user moves the fingers and the duration that the user remains at each point in the moving track.

After the receiver device receives the message, the image resource may be controlled and presented according to the above-mentioned control information.

According to the above-mentioned method, the image resource may be controlled according to the control information of the operation gesture, so that a form of the expression is enriched, the expression may be closer to the demand of the user, and the interestingness is increased.

In the second embodiment, the operation gesture includes the playing gesture for playing the image resource.

In some embodiments, the playing gesture may be a long-press gesture, a double-click gesture and the like, but is not specifically limited in the present disclosure. For example, the image resource is controlled to be played in response to being pressed for a long time or being double clicked for the first time and is controlled to stop playing in response to being double clicked again. The presenting duration is a time interval between first double-click time and second double-click time. The sender device determines a screen touching duration based on the operation gesture, and determines the control information based on the screen touching duration, and the screen touching duration is the presenting duration of the image resource.

After the receiver device receives the message, the presenting duration of the image resource is controlled to be equal to the screen touching duration. For example, the user clicks the image resource with click duration of 5 s, that is, the screen touching duration is 5 s. After the receiver device receives the message, the image resource is controlled to be presented for 5 s.

According to the above-mentioned method, the user may control the playing duration of the image resource according to the playing gesture, so that a playing content of the image resource may be controlled for a receiver, and the form of the emoticon may be closer to the demand of the user.

In a third embodiment, the operation gesture includes the drawing gesture.

In some embodiments, the user may trigger the drawing gesture by double click. For example, the user double clicks a specified display area, and draws a pattern without leaving the touch screen. The user can also trigger the drawing gesture with a single click.

The sender device determines the pattern based on the operation gesture, and determines the control information based on the pattern, and the pattern is presented together with the image resource.

In some embodiments, the pattern includes a bar chart or a pattern with a filling effect. For example, the pattern is a linear heart shape or a color-filled heart shape and the like.

After the receiver device receives the message, the pattern is controlled to be presented together with the image resource in the display interface.

Figure 5:
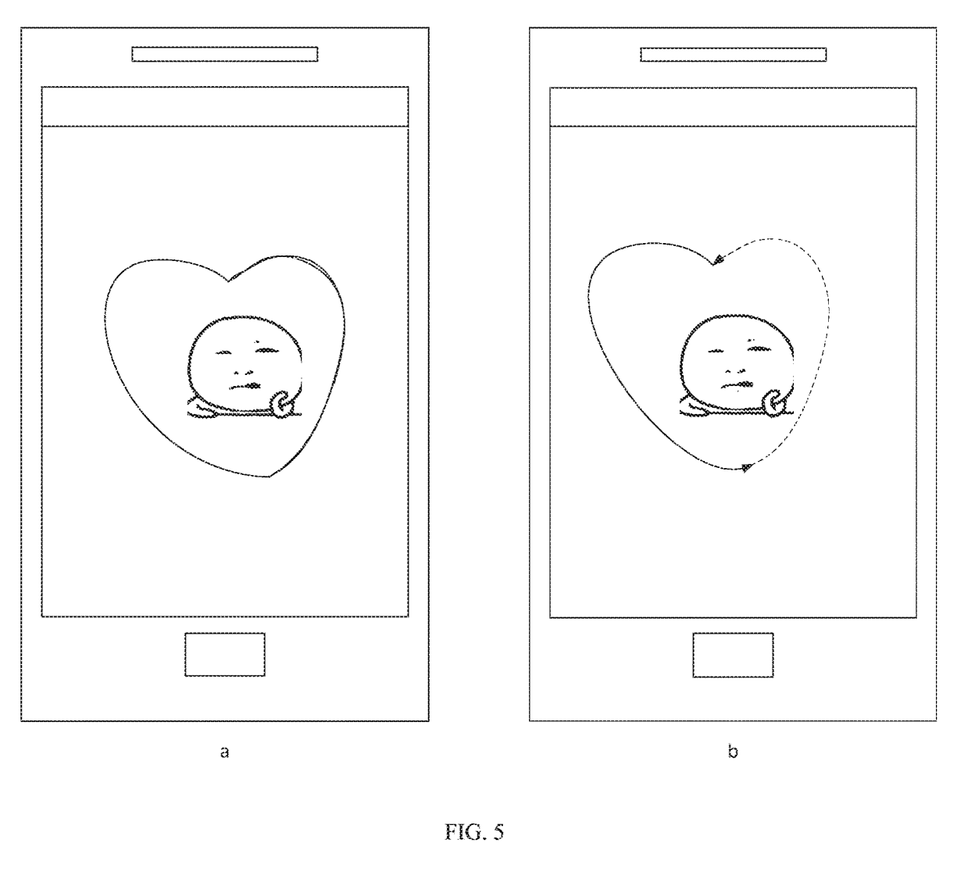
FIG. 5 illustrates a schematic diagram of further interface according to an embodiment of the present disclosure.

In some embodiments, FIG. 5 illustrates a schematic diagram of further interface provided by the present disclosure. The user draws a heart shape shown in FIG. 5, a by virtue of the drawing gesture in the specified display area. The sender device encapsulates the drawn heart shape and the image resource into the message and sends the message to the receiver device.

After the receiver device receives the message, the heart shape may be presented together with the image resource in the display interface, as shown in FIG. 5, b. During presentation in the display interface, it is possible to show only the pattern, or to show the process of the pattern, i.e., a process that the sender device draws the heart shape according to the drawing gesture.

According to the above-mentioned method, the pattern is drawn on the image resource and controlled to be presented together with the image resource, so that the form of the emoticon is enriched, and the emoticon application is closer to the demand of the user.

Figure 6:
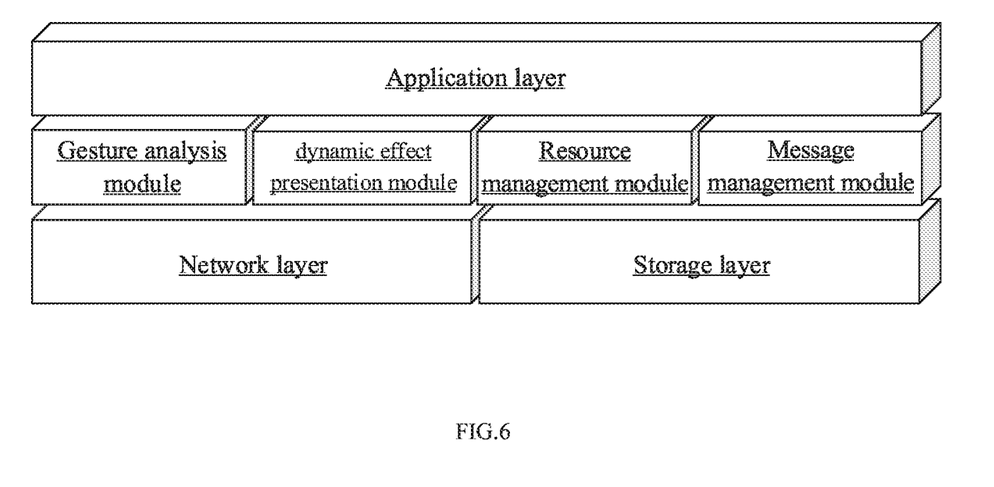
FIG. 6 illustrates a modular architecture diagram of a method for sending a message according to an embodiment of the present disclosure.

A modular architecture corresponding to a method for sending a message according to an embodiment of the present disclosure is described below, referring to FIG. 6 which illustrates the modular architecture diagram.

A sender device shows resource icons in a display interface and calls a resource management module to acquire an image resource corresponding to a resource icon, in response to operation instructions for selecting the resource icon. The resource management module stores the resource icons and corresponding resource allocations. The resource icons are provided with unique identifiers, each of the unique identifiers corresponds to one of the resource allocations, and each of the resource allocations includes an address and behavior description information of a static image in the image resource. Moreover, the sender device calls a gesture analysis module to detect an operation gesture in a specified display area, and determine the control information of the image resource.

The sender device calls a dynamic effect presentation module to present the image resource according to the control information. A message management module is generated a message by encapsulating the control information and the image resource, in response to a user triggers a sending function, and the message is sent to a receiver device.

During specific implementation, all the modules in the embodiment of the present disclosure are mutually independent so as not to affect one another.

Figure 7:
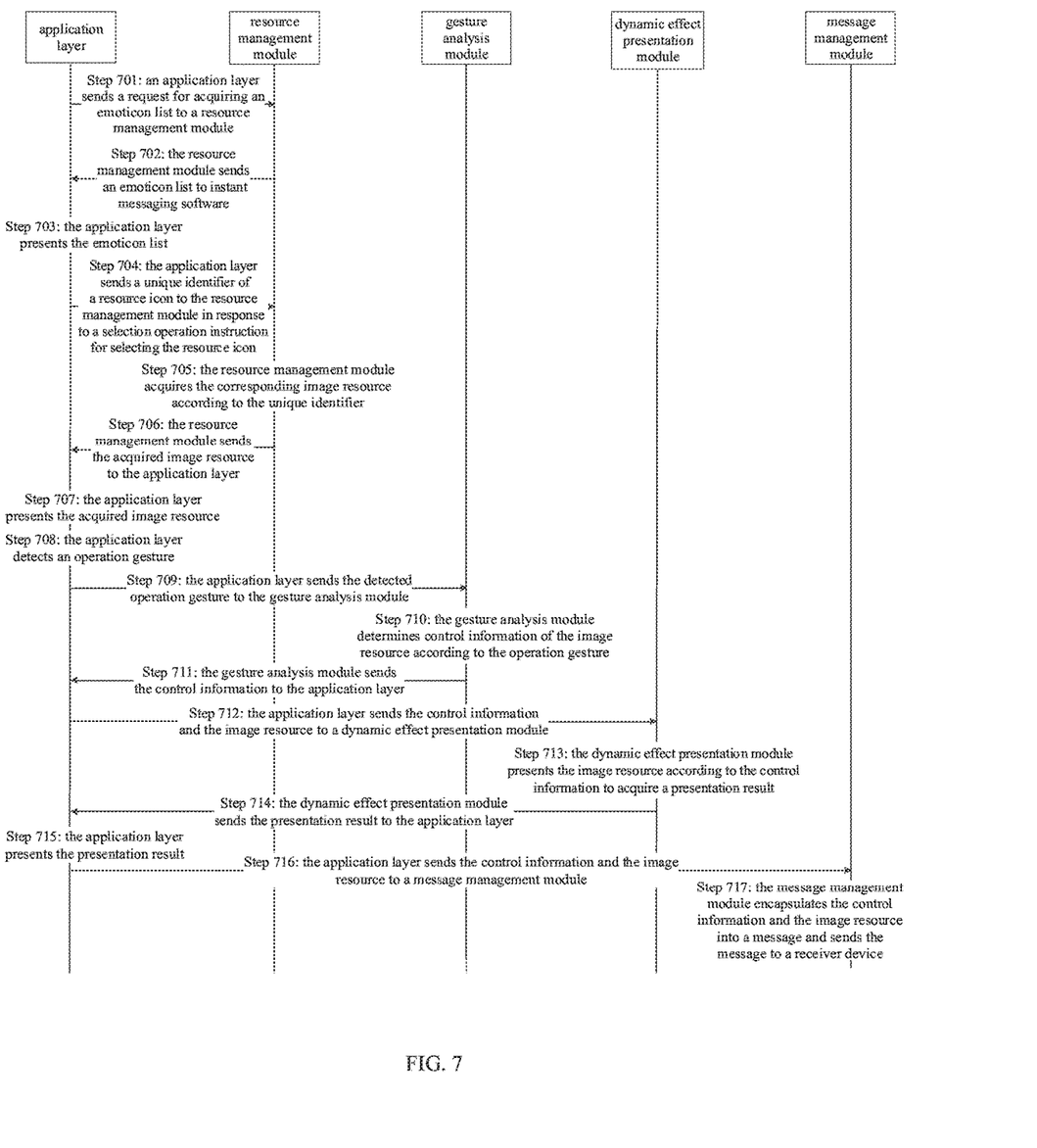
FIG. 7 illustrates a sequence diagram of a method for sending a message according to an embodiment of the present disclosure.

In some embodiments, FIG. 7 illustrates a sequence diagram of the method for sending a message provided by the present disclosure, and the method includes the following steps.

Step 701: an application layer sends a request for acquiring an emoticon list to a resource management module.

Step 702: the resource management module sends an emoticon list to instant messaging software.

Step 703: the application layer presents the emoticon list.

Step 704: the application layer sends a unique identifier of a resource icon to the resource management module in response to a selection operation instruction for selecting the resource icon.

Step 705: the resource management module acquires the corresponding image resource according to the unique identifier.

Step 706: the resource management module sends the acquired image resource to the application layer.

Step 707: the application layer presents the acquired image resource.

Step 708: the application layer detects an operation gesture.

Step 709: the application layer sends the detected operation gesture to the gesture analysis module.

Step 710: the gesture analysis module determines control information of the image resource according to the operation gesture.

Step 711: the gesture analysis module sends the control information to the application layer.

Step 712: the application layer sends the control information and the image resource to a dynamic effect presentation module.

Step 713: the dynamic effect presentation module presents the image resource according to the control information to acquire a presentation result.

Step 714: the dynamic effect presentation module sends the presentation result to the application layer.

Step 715: the application layer presents the presentation result.

Step 716: the application layer sends the control information and the image resource to a message management module.

Step 717: the message management module generates a message body by encapsulating the control information and the image resource and sends the message to a receiver device.

Figure 8:
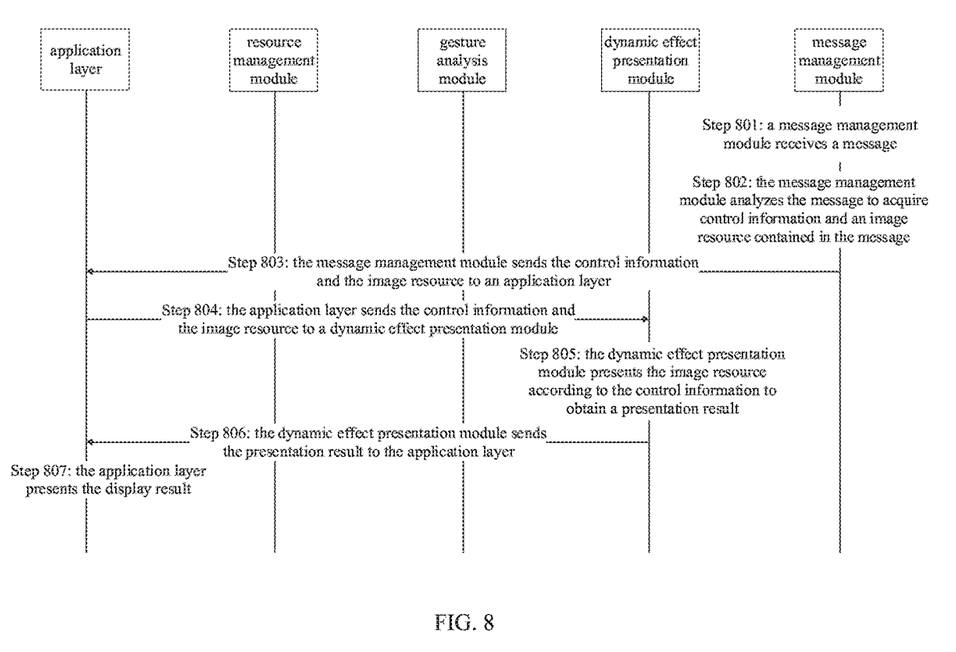
FIG. 8 illustrates a sequence diagram of a method for receiving a message according to an embodiment of the present disclosure.

In some embodiments, FIG. 8 illustrates a sequence diagram of a method for receiving a message provided by the present disclosure, and the method includes the following steps.

Step 801: a message management module receives a message.

Step 802: the message management module analyzes the message to acquire control information and an image resource contained in the message.

Step 803: the message management module sends the control information and the image resource to an application layer.

Step 804: the application layer sends the control information and the image resource to a dynamic effect presentation module.

Step 805: the dynamic effect presentation module presents the image resource according to the control information to obtain a presentation result.

Step 806: the dynamic effect presentation module sends the presentation result to the application layer.

Step 807: the application layer presents the display result.

Figure 9:
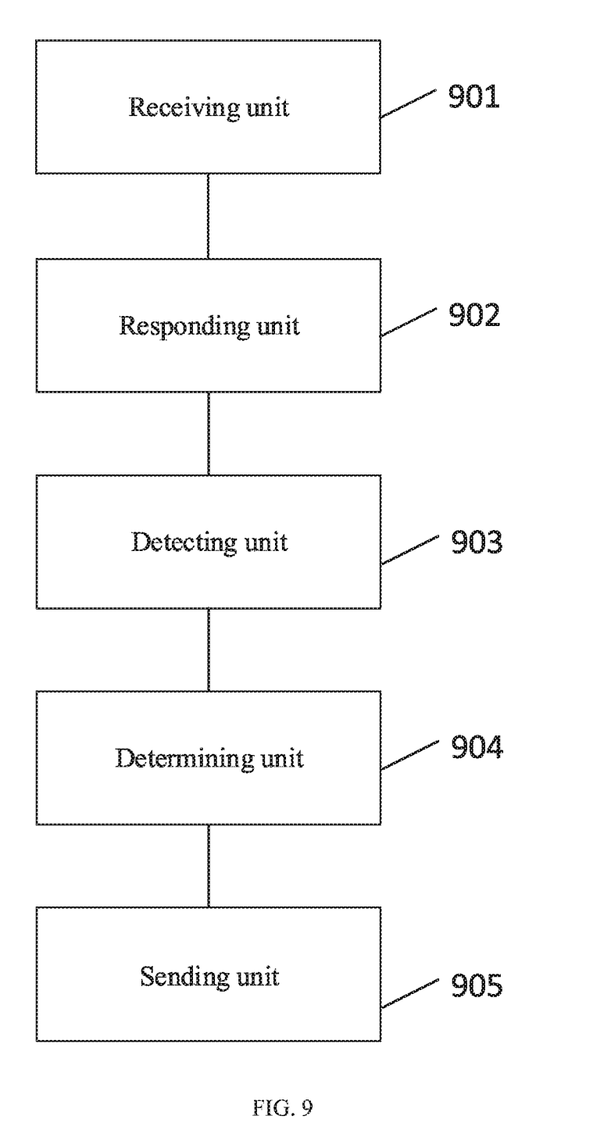
FIG. 9 illustrates a schematic diagram of a device for sending a message according to an embodiment of the present disclosure.

An embodiment of the present disclosure further provides a device for sending a message. Referring to FIG. 9 illustrates a schematic diagram of the device according to an embodiment of the present disclosure, and the device includes:

a receiving unit 901, configured to receive an operation instruction for selecting a resource icon a responding unit 902, configured to acquire an image resource based on the resource icon in response to the operation instruction;

a detecting unit 903, configured to detect an operation gesture;

a determining unit 904, configured to determine control information of the image resource for controlling a presentation effect of the image resource based on the operation gesture; and a sending unit 905, configured to generate the message by encapsulating the image resource and the control information, and send the message to a receiver device.

In some embodiments, the determining unit 904 is further configured to execute the operation:

determine a moving track based on the operation gesture, where the operation gesture includes a first gesture for moving the image resource; and determine the control information based on the moving track for presenting the image resource based on a motion track, where the motion track is matched with the moving track.

In some embodiments, the control information includes the moving track, key points of the moving track and presenting durations of respective key points;

where the key points are determined by the responding unit based on a selecting instruction; and where the presenting durations received by the receiving unit, are the durations that the image resource is presented at the respective key points.

In some embodiments, the determining unit 904 is further configured to execute the operation:

determine a screen touching duration based on the operation gesture, where the operation gesture includes a second gesture for playing the image resource; and determine the control information based on the screen touching duration for presenting the image resource with a presenting duration, wherein the presenting duration equals to the screen touching duration.

In some embodiments, the determining unit 904 is further configured to execute the operation:

determine a pattern based on the operation gesture, where the operation gesture includes a third gesture for drawing a pattern; and determine the control information based on the pattern for presenting the image resource with the pattern.

In some embodiments, the responding unit 902 is further configured to execute the operations:

acquire a unique identifier corresponding to the resource icon; and obtain the image resource based on a pre-stored corresponding relationship between the unique identifier and the image resource.

Figure 10:
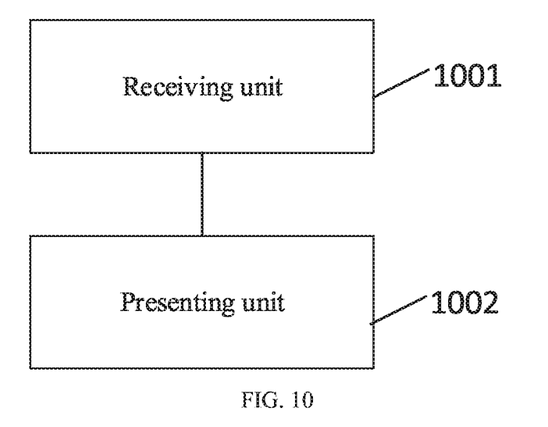
FIG. 10 illustrates a schematic diagram of a device for receiving a message according to an embodiment of the present disclosure.

An embodiment of the present disclosure further provides a device for receiving a message. Referring to FIG. 10 which illustrates a schematic diagram of the device according to an embodiment of the present disclosure, and the device includes:

a receiving unit 1001, configured to receive the message, where the message includes an image resource and control information, and the control information is used for controlling a presentation effect of the image resource; and a presenting unit 1002, configured to present the image source based on the control information.

In some embodiments, the presenting unit 1002 is further configured to execute the operation:

determine a motion track of the image resource according to the control information, where the control information includes a moving track; and present the image source based on the motion track.

In some embodiments, the control information further includes first key points of the moving track and presenting durations of respective first key points, where second key points of the motion track are matched with the first key points for determining the motion track; and where the presenting durations are used for presenting the image resource to stay at respective second key points for durations corresponding to the presenting durations respectively.

In some embodiments, the control information includes a screen touching duration for presenting the image resource for same duration as the screen touching duration.

In some embodiments, the control information includes a pattern drawn by a drawing gesture for presenting the image resource with the pattern.

Figure 11:
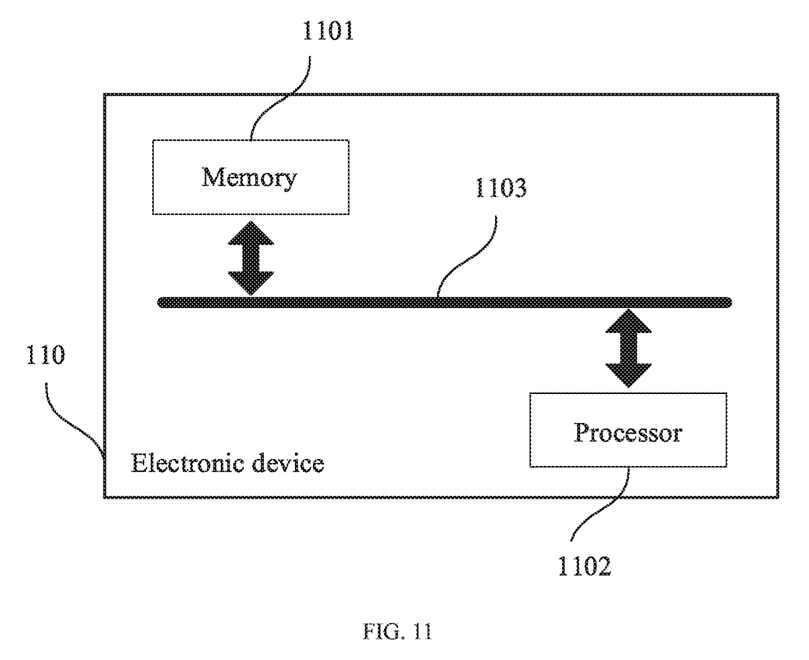
FIG. 11 illustrates a block diagram of an electronic device according to an embodiment of the present disclosure.

Referring to FIG. 11, an embodiment of the present disclosure further provides an electronic device 110 including a memory 1101 and a processor 1102.

The memory 1001 is for storing a computer program executed by the processor 1102. The memory 1101 may mainly include a program storage area and a data storage area, where the program storage area may store application programs and the like required by an operation system and at least one function; and the data storage area may store data and the like created according to the use of an information processing apparatus of a terminal device. The processor 1102 may be a central processing unit (CPU) or a digital processing unit and the like. A specific connection medium between the above-mentioned memory 1101 and processor 1102 is not limited in the embodiment of the present disclosure. In some embodiments, the memory 1101 is connected with the processor 1102 by a bus 1103 denoted by a bold line in FIG. 11, and connection ways among other components are only schematically illustrated, but are not limited. The bus 1103 may be divided into an address bus, a data bus, a control bus and the like. For facilitating denotation, the bus is only denoted with one bold line in FIG. 11, but it does not mean that there is only one bus or one type of bus.

The memory 1101 may be a volatile memory such as a random-access memory (RAM); and the memory 1101 may also be a non-volatile memory such as a read-only memory, a flash memory, a hard disk drive (HDD) or a solid-state drive (SSD), or the memory 1101 may be any other mediums which may be used for carrying or storing a desired program code with an instruction or data structural form and may be accessed by a computer, but is not limited to those. The memory 1101 may be a combination of the above-mentioned memories.

The processor 1102 is used for executing the method executed by the device in the embodiment as shown in FIG. 2, or the method executed by the device in the embodiment as shown in FIG. 7 and the method executed by the device in the embodiment as shown in FIG. 8 when the computer program stored in the memory 1101 is called.

In some possible implementation ways, each aspect of the methods provided by the present disclosure may also be implemented in a form of a computer program product including a program code; and when the computer program product operates on a computer device, the program code is used for making the computer device execute the above-mentioned steps of the methods in the present specification according to each exemplary implementation way of the present disclosure, for example, the computer device may execute the method executed by the device in the embodiment as shown in FIG. 2 or the method executed by the device in the embodiment as shown in FIG. 7 or the method executed by the device in the embodiment as shown in FIG. 8.

The computer program product may adopt one or any combinations of a plurality of readable mediums. The readable mediums may be readable signal mediums or readable storage mediums. The readable storage mediums may be, but are not limited to electric, magnetic, optical, electromagnetic, infrared or semiconductor systems, apparatuses or devices or any combinations of the above. A more specific example (a non-exhaustive list) of the readable storage mediums includes an electric connection with one or more conducting wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any appropriate combinations of the above.

Other implementation solutions of the present disclosure will be readily envisioned by those skilled in the art after considering the specification and putting the disclosure disclosed herein into practice. The present disclosure aims at covering any variations, purposes or adaptive changes of the present disclosure, and these variations, purposes or adaptive changes conform to a general principle of the present disclosure and include common general knowledge or conventional technical means in the undisclosed technical field of the present disclosure. The specification and the embodiments are merely regarded to be exemplary, and the true scope and spirit of the present disclosure are appointed by the following claims.

It should be understood that the present disclosure is not limited to precise structures which have been described above and shown in the accompanying drawings, and various modifications and alterations may be made without departing from the scope thereof. The scope of the present disclosure is merely limited by the appended claims.

What is claimed is:

1. A method for sending a message, comprising:
   receiving an operation instruction for selecting a resource icon;
   acquiring a unique identifier corresponding to the resource icon in response to the operation instruction;
   obtaining an image resource based on a pre-stored corresponding relationship between the unique identifier and the image resource;
   detecting an operation gesture;
   determining control information of the image resource for controlling a presentation effect of the image resource based on the operation gesture, comprising: determining a moving track based on the operation gesture, wherein the operation gesture comprises a first gesture for moving the image resource; determining key points of the moving track based on a selecting instruction; determining presenting durations based on duration setting of respective key points; determining the control information based on the moving track, the key points and the presenting durations, for presenting the image resource based on the moving track at the respective key points for the presenting durations, wherein the presenting durations are durations that the image resource is presented at the respective key points;
   generating the message by encapsulating the image resource and the control information; and
   sending the message to a receiver device.

2. The method of claim 1, wherein said determining the control information comprises:
   determining a screen touching duration based on the operation gesture, wherein the operation gesture comprises a second gesture for playing the image resource; and
   determining the control information based on the screen touching duration for presenting the image resource with a presenting duration, wherein the presenting duration equals to the screen touching duration.

3. The method of claim 1, wherein said determining the control information comprises:
   determining a pattern based on the operation gesture, wherein the operation gesture comprises a third gesture for drawing a pattern; and
   determining the control information based on the pattern for presenting the image resource with the pattern.

4. A method for receiving a message, comprising:
   receiving the message, wherein:
      the message comprises an image resource and control information,
      the image resource has a pre-stored corresponding relationship with a unique identifier, and the unique identifier corresponds to a resource icon selected by an operation instruction, and
      the control information is used for controlling a presentation effect of the image resource; and
   presenting the image source based on the control information, comprising: determining a moving track, first key points of the moving track, and presenting durations of respective first key points based on the control information; determining a motion track of the image resource based on the moving track; determining second key points of the motion track based on the first key points, wherein the second key points are matched with the first key points for determining the motion track; determining durations based on the presenting durations of respective first key points, wherein the durations correspond to the presenting durations respectively; presenting the image resource based on the motion track, and to stay at respective second key points for the durations based on the second key points, and the durations.

5. The method for receiving message of claim 4, wherein the control information comprises a screen touching duration for presenting the image resource for same duration as the screen touching duration.

6. The method for receiving message of claim 4, wherein the control information comprises a pattern drawn by a drawing gesture for presenting the image resource with the pattern.

7. A non-transitory storage medium, wherein in response to an instruction in the non-transitory storage medium executed by a processor of an electronic device, causes the electronic device to execute a method for sending a message comprising:
  receiving an operation instruction for selecting a resource icon;
  acquiring a unique identifier corresponding to the resource icon in response to the operation instruction;
  obtaining an image resource based on a pre-stored corresponding relationship between the unique identifier and the image resource;
  detecting an operation gesture;
  determining control information of the image resource for controlling a presentation effect of the image resource based on the operation gesture, comprising: determining a moving track based on the operation gesture, wherein the operation gesture comprises a first gesture for moving the image resource; determining key points of the moving track based on a selecting instruction; determining presenting durations based on duration setting of respective key points; determining the control information based on the moving track, the key points and the presenting durations, for presenting the image resource based on the moving track at the respective key points for the presenting durations, wherein the presenting durations are durations that the image resource is presented at the respective key points;
  generating the message by encapsulating the image resource and the control information; and
  sending the message to a receiver device.

8. The non-transitory storage medium of claim 7, wherein said determining the control information comprises:
  determining a screen touching duration based on the operation gesture, wherein the operation gesture comprises a second gesture for playing the image resource; and
  determining the control information based on the screen touching duration for presenting the image resource with a presenting duration, wherein the presenting duration equals to the screen touching duration.

9. The non-transitory storage medium of claim 7, wherein said determining the control information comprises:
  determining a pattern based on the operation gesture, wherein the operation gesture comprises a third gesture for drawing a pattern; and
  determining the control information based on the pattern for presenting the image resource with the pattern.

10. A non-transitory storage medium, wherein in response to an instruction in the non-transitory storage medium executing by a processor of an electronic device, the storage medium enables an electronic device to execute following method for receiving a message:
  receiving the message, wherein:
    the message comprises an image resource and control information,
    the image resource has a pre-stored corresponding relationship with a unique identifier, and the unique identifier corresponds to a resource icon selected by an operation instruction, and
    the control information is used for controlling a presentation effect of the image resource; and
  presenting the image source based on the control information, comprising: determining a moving track, first key points of the moving track, and presenting durations of respective first key points based on the control information; determining a motion track of the image resource based on the moving track; determining second key points of the motion track based on the first key points, wherein the second key points are matched with the first key points for determining the motion track; determining durations based on the presenting durations of respective first key points, wherein the durations correspond to the presenting durations respectively; presenting the image resource based on the motion track, and to stay at respective second key points for the durations based on the second key points, and the durations.

11. The non-transitory storage medium of claim 10, wherein the control information comprises a screen touching duration for presenting the image resource for same duration as the screen touching duration.

12. The non-transitory storage medium of claim 10, wherein the control information comprises a pattern drawn by a drawing gesture for presenting the image resource with the pattern.

* * * * *